United States Patent
Perez-Cordova (10) Patent No.: US 7,690,445 B2
(45) Date of Patent: *Apr. 6, 2010

(54) OIL CONTAMINATED SUBSTRATE TREATMENT METHOD AND APPARATUS

(75) Inventor: Ramon Perez-Cordova, Lerma (MX)

(73) Assignee: Racional Energy & Environment Co., Reno, NV (US)

( * ) Notice: Subject to any disclaimer, the term of this patent is extended or adjusted under 35 U.S.C. 154(b) by 878 days.

This patent is subject to a terminal disclaimer.

(21) Appl. No.: 10/904,163

(22) Filed: Oct. 27, 2004

(65) Prior Publication Data

US 2005/0145418 A1 Jul. 7, 2005

Related U.S. Application Data

(60) Provisional application No. 60/481,611, filed on Nov. 7, 2003.

(51) Int. Cl.
C09K 7/00 (2006.01)
C10G 33/04 (2006.01)
C10G 7/00 (2006.01)

(52) U.S. Cl. .......................... 175/66; 196/123; 196/126; 196/127; 203/96; 208/188

(58) Field of Classification Search .................... 175/66; 196/123, 126, 127; 208/188; 203/96
See application file for complete search history.

(56) References Cited

U.S. PATENT DOCUMENTS

| | | | |
|---|---|---|---|
| 1,444,794 A | 2/1923 | Kernan | |
| 4,014,780 A | 3/1977 | McCoy | 208/13 |
| 4,606,283 A | 8/1986 | DesOrmeaux et al. | 110/250 |
| 4,839,022 A | 6/1989 | Skinner | 208/13 |
| 4,913,586 A | 4/1990 | Gabbita | 405/129 |
| 4,990,237 A * | 2/1991 | Heuer et al. | 208/13 |
| 5,039,415 A | 8/1991 | Smith | 210/611 |
| 5,152,233 A | 10/1992 | Spisak | 110/240 |
| 5,199,354 A | 4/1993 | Wood | 110/241 |
| 5,228,804 A | 7/1993 | Balch | 405/128 |
| 5,234,577 A | 8/1993 | Van Slyke | 208/13 |
| 5,272,833 A | 12/1993 | Prill et al. | 47/1.42 |
| 5,302,118 A | 4/1994 | Renegar et al. | 432/14 |
| 5,378,059 A | 1/1995 | Brock | 366/7 |
| 5,414,207 A | 5/1995 | Ritter | 588/226 |
| 5,430,237 A | 7/1995 | Sharp | 588/252 |
| 5,630,785 A | 5/1997 | Pridemore et al. | 588/255 |
| 5,736,031 A | 4/1998 | Nye et al. | 208/340 |
| 5,788,781 A * | 8/1998 | Van Slyke | 134/40 |

(Continued)

Primary Examiner—Glenn Caldarola
Assistant Examiner—Prem C. Singh
(74) Attorney, Agent, or Firm—Daniel N. Lundeen; Lundeen & Lundeen, PLLC (57) ABSTRACT

A method and apparatus for treating for disposal oil contaminated substrates, such as drill cuttings from drilling with an oil-based mud, by steam distillation. If necessary, the contaminated substrate 10 can be pretreated with an emulsion breaker 14. The contaminated substrate 10 can be treated with steam 16 in a first mixing still 12. The substrate can be optionally treated with a second steam source 20 in a second mixing still 18. The steam provides heat to vaporize the oil, moisture to treat the substrate and water to the reaction mixture. Recoverable constituents in the vapor can be condensed in a vapor collection system 24. The treated substrate 22 is essentially free of oil and can have a controlled water content. The process exhibits low energy consumption, rapid treatment, compact equipment and a high degree of process control.

42 Claims, 5 Drawing Sheets

U.S. PATENT DOCUMENTS

| | | | |
|---|---|---|---|
| 5,927,970 A | 7/1999 | Pate et al. | 432/115 |
| 6,120,650 A | 9/2000 | Nye et al. | 196/116 |
| 6,668,947 B2 * | 12/2003 | Cordova | 175/66 |
| 6,978,851 B2 * | 12/2005 | Perez-Cordova | 175/206 |

* cited by examiner

SHAFT MOTION              SOLIDS FLOW PATTERN

OIL CONTAMINATED SUBSTRATE TREATMENT METHOD AND APPARATUS

CROSS REFERENCE TO RELATED APPLICATION

This application claims priority to U.S. Provisional Application Ser. No. 60/481,611 filed in the United States Patent and Trademark Office on Nov. 7, 2003.

FIELD OF THE INVENTION

This invention relates to the thermal treatment of solid substrates contaminated with oil for the environmentally acceptable disposal, and more particularly to the treatment of the drill cuttings with steam, and an optional organic demulsifier, for the purpose of rapidly removing oil from the drill cuttings to obtain treated drill cuttings essentially free of oil.

Oil-based drill cuttings are generally regarded as controlled or hazardous waste. As such, the drill cuttings can be disposed of in two different ways: (1) decontamination treatment; or (2) hazardous waste controlled landfill. Hazardous waste is considered a threat to the environment due to the risk of surface and subsurface water pollution, air pollution, and interrupting the equilibrium of the ecosystem. The disposal of hazardous waste in controlled landfills is usually a last environmental option, since the problem is only transferred from one place to another, and the ultimate solution and need for decontamination is merely postponed to a later date.

There are several technologies available to treat hazardous wastes. Each has advantages and limitations depending upon the concentration and type of contaminant, the matrix in which the contaminant is dispersed, and the locations at which the cuttings are generated and are to be disposed of, which can be the same or different. The handling and treatment costs, process time, contaminant locations, such as for example, ecologically protected areas, nearby water bodies, human residences, deserts, to name a few, and finally the total treatment time, are all factors considered in selecting the best available technology.

Oil and gas exploration depends on drilling wells at different depths with different diameters throughout different geological strata having multiple lithological manifestations such as clay, rock, sand, empty underground salt mines, brine and water tables. Drilling requires a drilling fluid, also known as drilling mud, having various physical functions such as: (1) cooling and lubrication of the drill bit; (2) formation of a filter cake for temporarily 'casing' the wellbore; (3) carrying the drill cuttings from the bit to the surface; and (4) preventing blowout of reservoir fluids. The solid pieces of material cut by the bit, as the drilling advances, are known as drill cuttings. The drilling mud is a fluid of physical-chemical compounds with specific rheological characteristics to cover all the needs of the well as the different geological layers, depths and extreme pressure of natural fluids are met.

There are two principal types of mud: (1) oil-based mud (also known as inverse emulsion mud); and (2) water-based mud. Their formulations vary according to the technology of each supplier and the general characteristics of each well in each field. These formulations are generally expensive, which is the reason for recirculating them. Before recirculation, their formulation must be adjusted to replace compounds lost during the process. The composition of many drilling muds typically includes the following compounds: (1) bentonite; (2) barite; (3) diesel or other oil; (4) polymers; (5) sodium, calcium and potassium chlorides; (6) lime; and (7) water. Water-based mud does not use diesel or oil, but does use the chlorides. The inverse emulsion generally uses more diesel than water, and may also include hydrocarbons to enhance the lubricating properties of the fluid. As used herein, the term "oil-based mud" also includes synthetic muds that are sometimes classified separately even though they contain appreciable amounts of hydrocarbons. Oil-based mud typically can include refined hydrocarbons instead of diesel. Even though oil-based muds can be cheaper to use and can have operating advantages, water-based mud is sometimes used instead of the oil-based drilling fluids because the water-based mud has fewer issues related to disposal.

In all cases, the mud is a stable physical emulsion, necessarily so to prevent separation of its components that may have different densities and other physical-electrical characteristics. Mud can be sticky and elastic, like gum, without losing its fluid qualities. As the contaminated oil-based drill cuttings lose water, they become stickier in nature.

The mud is injected through the center of the drill string to the bit and exits to the surface in the annulus between the drill string and the wellbore, fulfilling, in this manner, the cooling functions and lubrication of the bit, casing of the well and, finally, carrying the drill cuttings to the surface. At the surface, the mud can be separated from the drill cuttings to be reused, and the drill cuttings can be disposed of, usually in controlled landfills.

The separation of the mud and drill cuttings is not perfect since the cuttings retain part of the drilling mud in concentrations that can vary between 25 and 50 weight percent, or greater. Thus, drill cuttings can be considered hazardous waste, depending on the residual components of the mud and their concentrations. Because of the presence of hazardous compounds such as diesel, chlorides, polymers, etc., environmental concerns demand that the drill cuttings showing contaminant characteristics be handled and processed carefully before disposal into the environment. Several known prior art technologies for the treatment of inverse emulsion contaminated drill cuttings include: (1) incineration; (2) stabilization and encapsulation; (3) thermal desorption; (4) chemical oxidation; (5) biochemical degradation; and (6) controlled landfills. The criteria used most often for selecting the best technology are: (1) environmental reliability (environmental risk); (2) specific environmental requirements, by legislation as well as geographical location; (3) limitations presented by each technology (reliability of the equipment and processes); (4) costs; (5) process speed vs. cuttings generation speed; (6) available space for treatment; (7) characteristics of the final disposal site; and (8) logistics. Encapsulation is rarely used because of the high risks involved since there is no guarantee of 100% encapsulation nor is there a guarantee that encapsulation will last over a long period of time under any environment at the final disposal site. Examples of encapsulation are disclosed in U.S. Pat. No. 4,913,586 to Gabbita; and U.S. Pat. No. 5,630,785 to Pridemore et al.

Biochemical degradation, as disclosed in U.S. Pat. No. 5,039,415 to Smith, requires constant supervision and control during the entire process, and this option is time consuming and treatment may take several years in each case. Controlled landfill is less and less attractive since the problem is not solved, and only changes the place and time for ultimate resolution. Additionally, this method of treatment may not be attractive for offshore drilling applications.

Examples of incineration processes include U.S. Pat. No. 1,444,794 to Kernan; and U.S. Pat. No. 4,606,283 to Des-Ormeaux et al. The main limitation for incineration lies in the operational costs and process control difficulties due to tight stoichiometric operating ranges that are hard to maintain when contaminant concentrations are variable. Moreover, the incineration process is energy intensive because the entire matrix has to be heated to combustion temperatures, and many of the constituents have high thermal coefficients. Furthermore, flexibility to set up incineration equipment in the field is low and the logistical costs are high.

Thermal desorption, as disclosed in U.S. Pat. No. 5,228,804 to Balch, U.S. Pat. No. 5,272,833 to Prill et al. and U.S. Pat. No. 5,927,970 to Pate et al., presents several limitations, including low thermal efficiency, poor process control, low flexibility, high investment and operating costs, and low feasibility for in situ projects. The thermal efficiency of thermal desorption process is even lower than for incineration since the entire matrix is exposed to indirect heating, creating additional investment, maintenance and operational costs, along with poor process control. The viscoelastic characteristics of drill cuttings make processing difficult because of a tendency for the drill cuttings to stick to walls and other equipment surfaces, thereby reducing thermal transmission by effectively decreasing the inner diameter of the drum with less productivity and/or quality. Furthermore, thermal desorption requires additional treatment for the recovered gases, by condensation or other means of treatment, further increasing the cost.

Prill et al. disclose supplying indirect heat to hydrocarbon materials and combusting the hydrocarbons and other combustibles at temperatures between 371° and 427° C. (700° and 800° F.). Balch discloses recovering hydrocarbon contaminants from contaminated soil through the injection of heated air into an ex situ body to vaporize volatile hydrocarbons.

There are several patents disclosing rotary kilns designed to remove volatile hydrocarbons and other contaminants from solids, such as for example, drill cuttings or sludge. Representative references include U.S. Pat. Nos. 5,152,233; 5,199,354; 5,302,118; and 5,378,059. Rotary kilns generally provide indirect heat to drive volatile hydrocarbons absorbed on solids for disposal.

The recovery of oil from refinery sludges by steam distillation is disclosed in U.S. Pat. No. 4,014,780 to McCoy. Specifically, sludge materials are passed downwardly through a series of rotating gates where the materials are contacted with steam. The steam vaporizes volatile hydrocarbons contained within the sludge and/or substrate as the vapor rises within the chamber.

Chemical oxidation is disclosed in U.S. Pat. No. 5,414,207 to Ritter, for example. In this approach, lime preconditioned with a hydrophobizing agent is blended with wet soil in an inert atmosphere and introduced to a decomposition vessel. Air can be introduced to the mixture to effect oxidation and/or hydrolysis of the oil contaminants. The main focus of this approach is to delay hydrolysis of the lime until well after the mixture is blended to favor oxidation/hydrolysis of the organic contaminants, and as a consequence the process is relatively slow and not continuous.

SUMMARY OF THE INVENTION

The present invention is directed to the discovery of a distillation method and apparatus for treating a substrate contaminated with oil for environmental disposal. Where desired, the process provides for the pretreatment of the substrate with an emulsion breaker, mineral acid, and/or alkaline earth, followed by the addition of steam or some other direct heat source, under conditions of vigorous agitation, preferably high shear. The present invention achieves rapid contaminant removal with residence times of 100-120 second or less.

In a first embodiment of the present invention is provided a distillation method for removing hydrocarbons from a substrate comprising oil contaminants. The method includes the steps of: (a) pre-treating the substrate with an organic emulsion breaker; (b) heating the pretreated substrate with a heat transfer medium to vaporize the oil; (c) recovering the vaporized oil; and (d) recovering a treated substrate of reduced oil content.

The substrate heating can be done by direct heat transfer. The method can include admixing the heat transfer medium with the substrate. The heat transfer medium can be steam, air or nitrogen. The substrate can be fluidized.

In another embodiment of the invention, a steam distillation method for removing hydrocarbons from a substrate comprising oil contaminants is provided. The method can include the steps of: (a) admixing the substrate with a first steam source with vigorous mixing to vaporize the oil therein; (b) recovering steam vaporized oil; and (c) recovering a treated substrate of reduced oil content.

The substrate can include drill cuttings, and the substrate can contain less than 10 percent oil by weight. The method can also include pre-treating the substrate with an organic emulsion breaker prior to the admixing in (a). The emulsion breaker can include an organic acid or addition salt. The emulsion breaker can include an alkylsulfonic acid, arylsulfonic acid, alkylarylsulfonic acid, aralkylsulfonic acid, or a combination thereof. The emulsion breaker can include alkylbenzenesulfonic acid or dodecylbenzenesulfonic acid. The method can further include admixing the treated substrate from (a) with a second steam source with agitation to further vaporize remaining oil, and recovering a solid product essentially free of oil. The admixing can be under high shear conditions, and the substrate can be fluidized.

The method can further include the steps of: continuously introducing the substrate into an inlet end of a first mixing still comprising at least one rotatable shaft disposed longitudinally in a housing and having a plurality of impellors spaced along the shaft. If the substrate has a water content of less than 20 weight percent or an oil content of more than 30 weight percent, an organic emulsion breaker can be continuously introduced into the first mixing still at a first location adjacent the inlet end, and a first steam source can be continuously introduced into the first mixing still at a second location adjacent to an outlet end of the first mixing still. The at least one shaft of the first mixing still is rotated to continuously maintain high shear conditions in the first mixing still and discharge the treated solid substrate essentially free of oil.

The substrate can have a residence time in the first mixing still of less than 100 seconds. The substrate can have a residence time in the first mixing still of less than 50 seconds. The substrate can be fluidized in the first mixing still and can include drill cuttings. The drill cuttings can include oil contaminated clay or can be contaminated with oil-based drilling mud. The substrate can contain less than 10 percent oil by weight.

The method can further include pre-treating the substrate with an organic emulsion breaker prior to the admixing. The emulsion breaker can include an organic acid or addition salt, which can include an alkylsulfonic acid, arylsulfonic acid, alkylarylsulfonic acid, aralkylsulfonic acid, or a combination thereof. The emulsion breaker can include alkylbenzenesulfonic acid or dodecylbenzenesulfonic acid. The emulsion breaker can be admixed at a rate of from 0.5 to 5 parts by weight per 100 parts of substrate. The method can include recovering vapor generated from the first mixing still, condensing the recovered vapor, and exhausting non-condensed gases.

The method can further include continuously introducing the treated solid substrate from the first mixing still into an inlet end of a second mixing still which can include at least one shaft disposed longitudinally in a housing and having a plurality of impellors spaced along the shaft; continuously introducing a second steam source into the second mixing still at a location adjacent an outlet end thereof; and rotating the at least one shaft of the second mixing still to maintain high shear conditions in the second mixing still and continuously discharge a solid substrate from the outlet end of the second mixing still, wherein the solid substrate is essentially free of oil.

The method can also include peptizing the substrate with alkaline earth, which can include lime. The alkaline earth can be added to the substrate prior to being introduced into the first mixing still. The method can further include peptizing the substrate with mineral acid. The emulsion breaker can be admixed at a rate of from 1 to 1.5 parts by weight per 100 parts of drill cuttings. The method can further include recovering vapor generated from the first and second mixing stills, scrubbing the recovered vapor and exhausting non-condensed gases from the recovered vapor into the atmosphere. The vapor can exit the mixing still through insulated columns connected to a condensing column. The water recovered by condensation can be recycled to the steam supply. The substrate in the second mixing still can be fluidized.

In another embodiment is provided a method for treating drill cuttings contaminated with oil. The method can include the steps of: (a) continuously introducing the drill cuttings into an inlet end of a first mixing still comprising at least one rotatable shaft disposed longitudinally in a housing and having a plurality of impellors spaced along the shaft; (b) continuously introducing a first steam source into the first mixing still from a location adjacent an outlet end thereof; (c) rotating the at least one shaft of the first mixing still to continuously maintain high shear conditions in the first mixing still and discharge an intermediate solid substrate; (d) continuously introducing the intermediate solid substrate into an inlet end of a second mixing still comprising at least one shaft disposed longitudinally in a housing and having a plurality of impellors spaced along the shaft; (e) continuously introducing a second steam source into the second mixing still at a location adjacent an outlet end thereof; (f) rotating the at least one shaft of the second mixing still to maintain high shear conditions in the second mixing still and continuously discharge a solid substrate from the outlet end of the second mixing still, wherein the solid substrate contains less than 3000 ppm oil; (g) recovering vapor from the first and second mixing stills; and (h) condensing liquid from the recovered vapor to form an exhaust stream of uncondensed vapor. The impellers on the first and the second mixing still shafts are rotated at between 2 and 8 meters per second.

In another embodiment of the invention, an apparatus for the treatment of an oil contaminated substrate is provided. The apparatus can include means for admixing the substrate with steam and agitation to vaporize the oil therein; means for recovering steam vaporized oil; and means for recovering a treated substrate of reduced oil content.

In another embodiment of the invention, an apparatus for the treatment of an oil contaminated substrate is provided. The apparatus can include means for pre-treating the substrate with an organic emulsion breaker; means for heating the pretreated substrate with a heat transfer medium to vaporize the oil; means for recovering the vaporized oil; and means for recovering a treated substrate of reduced oil content.

In another embodiment of the invention, an apparatus for the treatment of an oil contaminated substrate is provided. The apparatus includes: a first reactor comprising a longitudinal housing having an inlet at a first end and an outlet at an opposite end, the first reactor having at least one rotatable shaft disposed longitudinally in the housing, and having a plurality of impellers spaced along the at least one shaft; a second reactor comprising a longitudinal housing having an inlet at a first end and an outlet at an opposite end, the second reactor having at least one rotatable shaft disposed longitudinally in the housing, and having a plurality of impellers spaced along the at least one shaft; a steam source for continuously introducing steam into the first reactor at a location adjacent an outlet of the first reactor and into the second reactor at a location adjacent an outlet of the second reactor; a first feeder for continuously introducing the substrate into the inlet of the first reactor; a chute for continuously transferring reaction product from the outlet of the first reactor into the inlet of the second reactor; a second chute for continuously removing reaction product away from an outlet of the second reactor; a vapor collection system for recovering gases from the first and second reactors; a condenser for condensing liquid from the gases from the vapor collection system and producing a stream of uncondensed gases; and an exhaust port for discharging uncondensed gases.

DETAILED DESCRIPTION

The present invention provides a method and apparatus for the thermal treatment of contaminated substrates with agitation for the removal of volatile contaminants to produce a treated substrate suitable for disposal. The process steps applied within this invention include the sequential mixing of an oil-contaminated substrate with a heat source with agitation. Preferably the heat is supplied by the direct application of steam. Alternatively, superheated steam can be supplied to vaporize the organic contaminants. The application of heat initiates steam distillation of oil and any other volatile organic contaminants present in the substrate. The presence of water in the mixture can facilitate the distillation and aid in vaporization of the volatile materials being removed. Steam distillation is preferable to effectively lower the distillation temperature of high boiling organic compounds that are essentially immiscible in water. In these cases, both the contaminant organic compound and the water exert their full vapor pressure to establish an equilibrium between the component partial pressures based upon temperature to the mixture. The total pressure exerted by a mixture of immiscible liquids is the sum of the vapor pressures of the individual components, at the existing temperature. When the vapor pressure equals the total pressure, the mixture will boil and the boiling point must be lower than the vapor pressure of any of the components individually. The result is that distillation of the higher boiling compounds can be accomplished at much lower temperature than normally required. The treated product can be a dried solid essentially free of oil and other contaminants.

Alternatively, the oil-contaminated substrate can be introduced into an aqueous environment and directly heated under pressure and mixed with agitation to volatize any contaminates present in the substrate. Preferably, the mixing can be under high shear conditions. The oil contaminated substrate can preferably be drill cuttings, containing a minor portion of oil by weight. Preferably, the contaminated substrate contains less than 15 percent oil by weight, and more preferably less than 10 percent oil by weight.

Drilling mud can be a stable emulsion comprised of several chemical products performing many different functions for the drilling of a well, such as temporary casing by the formation of a filter cake, drill bit lubrication and cooling, as well as facilitating removal of cuttings from the bottom to the wellbore. The density of the mud can vary anywhere from between 900 g/l to 5 kg/l; however, all of the mud constituents must remain in suspension during operation. During normal subsurface drilling operations, drilling mud and cuttings from the different geological strata are received at the surface for separation and recycling of the mud. Drill cuttings can be clean as they exist in the formation, but both at the drill bit and as they travel on their way to the surface, the cuttings typically become contaminated with the constituents of the mud. After separation of the mud from the drill cuttings, the mud can be recovered for further reuse and the drill cuttings must be disposed of.

The separation of the cuttings from the mud is not perfect, as some mud remains within the cuttings, intimately mixed, emulsified and often at high concentrations of the viscous products, making the cuttings a viscoelastic product. In the same cuttings, the chemical products can be bound up as contaminants, forming a sticky matrix, which is difficult to handle and process for decontamination. Thus, drill cuttings can present a very unique technological problem for treatment since the matrix covering the cuttings impedes the penetration of traditional treatment reagents. These residues are not liquid, but are instead very stable solid-liquid dispersions. The solid phase can be colloidal with thixotropic properties, and the liquid phase can be an oil/water mixture.

Although the present invention is described herein with specific reference to drill cuttings as one example, and especially drill cuttings obtained from operations with oil-based drilling muds, other contaminated or environmentally hazardous wastes or substrates can also be treated using the present methodology and apparatus, especially clay-containing wastes. Drill cuttings can contain large quantities of clay because the oil deposits and other strata typically have a high content of clay. There are also a wide range of applications for clay at the industrial level, such as in ceramics, paper, drilling fluids, and certain types of lubricating oils. Furthermore, clay can be used in insecticides, adhesives, rubber and plastics, as a catalyst, or as catalyst support.

The present invention utilizes volatilazation and/or chemical oxidation of contaminants to reduce contaminant levels below those required for safe environmental disposal. The apparatus is designed so that the process can be carried out in an automated manner, continuously, reliably and efficiently. Energy usage per treated weight unit of substrate is minimal. Following treatment according to this invention, the treated drill cuttings or other solid waste can be disposed of in any land fill as would any other nontoxic, non-hazardous industrial residue.

Contaminated oil-based drill cuttings can be in the form of a stable emulsion that must be broken before attempting treatment of the drill cuttings. Breaking the matrix of the oil-based drill cuttings is both a physical and chemical process, consisting of taking apart and separating each one of the components, invariably producing two liquid phases, an organic (oil) phase and an aqueous phase, and a solids phase. The two phases can be formed by modifying the polarity of each of the two phases within an aqueous media through the addition of an emulsion breaker, which can be enhanced by the addition of heat or agitation, or a combination thereof.

The emulsion breaker can be an acidic or polyvalent compound that is capable of destroying or "breaking" a water-in-oil emulsion. Some emulsions associated with drilling cuttings can be easily broken by a strong mineral acid, particularly where the drill cuttings have a relatively high water content (>20 percent), low oil content (<30 percent), and are generally free of large clumps or balls of solids. Other emulsions having a relatively low water content or a relatively high oil content, or that exhibit solids clumping, are not as easily broken by the mineral acid alone and often require an additional emulsion breaker. Alkylaromatic sulfonic acids, such as for example, dodecylbenzenesulfonic acid (DDBSA), are materials that can change the polarity of the solution and certain other physical properties such as viscosity and interfacial surface tension, without significantly altering chemical properties other than the pH. These compounds can be used in relatively small volumes and can preferably be biodegradable or chemically oxidizable without toxic residue for use in environmental projects. In the present invention, the emulsion breaker can preferably be an amphiphilic molecule or ion, meaning that one portion of the molecule is hydrophobic (water repellent) and another portion is hydrophilic (attracts water). The hydrophobic (tail) portion is usually a water-insoluble hydrocarbon chain, especially one of 12 or more carbon atoms. The hydrophilic (head) portion is ionic or polar water-soluble group (such as for example, oxyethylene chain, —$NH_2$, —$SO_2OH$, etc.). Within the solution, the emulsion breaker tends to concentrate at the water/oil interface, where the hydrophilic heads can be hydrated with water, and the hydrophobic tails are attracted to the oil molecules.

The demulsification can be done in two different manners, in situ or ex situ. In situ demulsufication can be done by adding the demulsifier directly to the substrate in the mixing still. Ex situ demulsification can be done by adding the demulsifier to the aqueous substrate prior to feeding the drill cuttings to the mixing still, such as for example, adding the demulsifier to the substrate in an open space on the drilling site or at a remote location. The principles of in situ and ex situ demulsificaiton are generally the same and predominantly depend on the demulsifier properties. Due to the specific characteristics of each compound in both the drill cuttings and the mud, different treatments are required so that a generalization of the treatment process is difficult. Some of the variables that can be controlled in breaking the emulsion include: (1) type and quantity of demulsifier; (2) pH of the mix; (3) quantity of transfer vehicle (e.g. water); (4) homogenization time; (5) residence time; and (6) temperature of mixture. The effectiveness of the technique can also depend on the characteristics of the contaminated matrix of the cuttings, such as: (1) permeability; (2) porosity; (3) homogenity of the medium; (4) texture; and (5) mineralogy.

Although the temperature of the mixture can be an important factor in breaking the organic phase, there are demulsifiers, such as alkylbenzenesulfonates, preferably in acid form, i.e. alkylbenzenesulfonic acids, such as for example, dodecylbenzene sulfonic acid (DDBSA), that work at ambient temperature. Use of the demulsifier at room temperature facilitates treatment and safeguards the operation, thereby eliminating the need for external heating and lowering the overall treatment costs. Either linear or branched alkylbenzenesulfonic acids can be used advantageously to break the emulsion.

Preferably, the addition of the demulsifier results in essentially complete breaking of the emulsification without requiring the addition of excess demulsifier. Excess demulsifier often requires the addition of alkaline earth, as described below, and increases the overall cost of the process. In most applications, the proportion of emulsion breaker employed can range from 0.5 to 5 parts by weight per 100 parts of substrate (pph), preferably from 1 to 3 pph, and especially from about 1 to about 1.5 pph. The pH of the raw drill cutting can also affect the amount of DDBSA required to break the emulsion. For example, if the pH is relatively low (for example 9), the optimum quantity of DDBSA may be 1 pph, but when the pH of the matrix is relatively high (for example 13), the optimum quantity of DDBSA might be 1.5 pph.

The emulsion breaker can be added as a neat liquid or as a solid, but it is most conveniently added as a liquid. Depending on its physical state at ambient temperature, the emulsion breaker may need to be liquefied by heating and/or by dilution with water or other solvent. In this manner, the water required for the distillation process can be conveniently added with the emulsion breaker, in amounts described below. For example, the emulsion breaker can be added to the raw drill cuttings from an aqueous solution typically containing from 5 to 10 weight percent of the DDBSA.

As previously mentioned, the invention can be particularly applicable to hazardous wastes containing clay. When clay contacts organic compounds and water, its physical-chemical behavior can be altered, often causing unpredictable results. These changes can be reflected in the formulation of extremely stable dispersions, which become more stable when in water or soil, where chemical compounds which form ions in aqueous solution can be found.

The treatment of the contaminated substrate can be facilitated by the initial treatment with DDBSA, especially where the drill cutting matrix is very sticky, as is the case in high oil/low water mixtures. The subsequent treatment of the high oil/low water mixtures with mineral acid and/or alkaline earth is efficient and economical, without compromising the environment. The mixture can be peptized, thereby forming a colloidal suspension to better separate the components for exposure to the steam. Peptizing is a physical process that does not break the molecules, and does not flocculate the components of the mixture. In this process, chrome salts, manganese and iron are preferably avoided. During the acidification, apart from destabilizing the agglomerated clay particles, the solid phase is activated to develop its colloidal properties and promote peptization. The peptization can occur to an even greater extent upon the addition of lime. The addition of acid, or more preferably alkaline earth, can facilitate peptization and ensure that the substrate particles are sufficiently small enough to allow for suspension of the particles in the air when subjected to high shear conditions. The suspension of the particles facilitates proper contact between the contaminated substrate and the steam, allowing for short residence times in the mixing still, and rapid distillation of the volatile organics from the substrate.

The use of steam as a method of supplying direct heat for the decontamination of contaminated substrate replaces the need for the storage and application of large volumes of highly caustic substances such as concentrated mineral acids. Preferably the steam is applied under low pressure. Additionally, under certain circumstances, steam may be more readily available and less expensive than the alternate heating or decontamination sources. Steam may be produced by any conventional method, and can be introduced to the mixing still at a pressure of between 70 and 350 KPa (10 and 50 psi), preferably between 140 and 280 KPa (20 and 40 psi), and more preferably, at approximately 210 KPa (30 psi). For most applications, steam is preferably continuously introduced to the mixing still at a rate of at least 20 kilograms of steam per kilogram of oil in the substrate, depending on the concentration of the contaminant in the substrate. In addition, external heat can be applied indirectly to the large mixing still wherein the substrate or contaminated material is contained in an aqueous solution, or direct heat can be supplied through the addition of hot air or hot nitrogen, at a rate of at least 1 kilogram of air per kilogram of oil in the substrate, to the mixing still system. Ideally, sufficient steam and/or heat can be applied to ensure that the steam and volatilized hydrocarbons do not condense to form a liquid in the mixer. The addition of hot air and/or hot nitrogen can also assist in keeping the steam and hydrocarbons in the vapor phase.

Due to the temperatures generated by the application of steam to the substrate, much of the water present in the drill cuttings, and much of the water added to the drill cuttings with the emulsion breaker, may be vaporized. If too much water is initially present in the mixture, taking into account the water present in the drill cuttings, the reaction temperature may be suppressed to the point that the volatilization of the organics and water can be adversely affected, and the end product may contain an undesirably high level of moisture and/or non-volatilized hydrocarbons. On the other hand, if too little water is added, the emulsion may not be adequately broken, and the substrate and the treated product may be too dry, thereby causing dusting. Furthermore, if the emulsion is not adequately broken, the hydrocarbons may not be exposed to the steam and may remain within the treated mixture. As a practical matter, the quantity of water added with the emulsion breaker, for example, can be adjusted until the desired amount of steam per kilogram of oil is reached for optimum conditioning of the substrate. The water is preferably added with the emulsion breaker, but can also be added separately. The proportion of water in the drill cuttings following emulsion breaker addition is preferably in the range of from 20 to 40 pph. Alternatively, the emulsion breaker can be preheated to reduce the temperature of the steam and/or hot gas added to the mixing still.

The alkaline earth is preferably lime and can be added in amounts determined by the pH and type of substrate. Generally, substrates having a pH less than 10 require the addition of greater amount of alkaline earth. In addition, when the substrate materials include hard shale and clay, the substrate may require the application of alkaline earth to pre-treat the substrate prior to steam distillation. Sands generally do not require pretreatment with an alkaline earth. However, not every steam distillation process requires the addition of alkaline earth. A variety of factors, including the pH of the drilling fluid and the clay content of the substrate, determine whether the addition of alkaline earth is necessary. The alkaline earth typically conditions the substrate, reducing it into small particles. The smaller particle size allows the particles to become suspended in the steam when subjected to agitation, or more preferably to high shear conditions, resulting in more effective contact between the steam and the substrate and a more effective distillation. If desired, lime can be added to the substrate prior to introduction into the first mixing still, directly into the first mixing still for admixing with the substrate, or directly into the second mixing still, when a second still is employed.

The amount of alkaline earth added to the substrate varies from case to case, generally depending upon the amount of hydrocarbon present in the substrate. When necessary, lime can be added in an amount of between 5 and 25 percent by weight of drill cuttings, preferably from 8 to 15 percent by weight.

Material conditioning refers to the maximum moisture content present in the treated solid at the end of the process, and is preferably not less than 3 weight percent so that handling and final disposition are facilitated. The conditioning of the treated solid is another advantage of the present invention because the initial product has a relatively high moisture content as compared with the finished product, which is an easily handled dry powder, thereby allowing for final disposal of the treated solids without water as a significant residue. The specific gravity of typical oil based drill cuttings can be transformed, for example, from approximately 2.2 at the input to between 1.1 and 1.2 in the treated cuttings. In the present process, the water content of the treated solids can be controlled to avoid dusting while at the same time maintaining a low water content and avoiding the need for any post-treatment processing such as spraying the treated solids with water or a surfactant, as can be necessary in some prior art processes.

Figure 1:
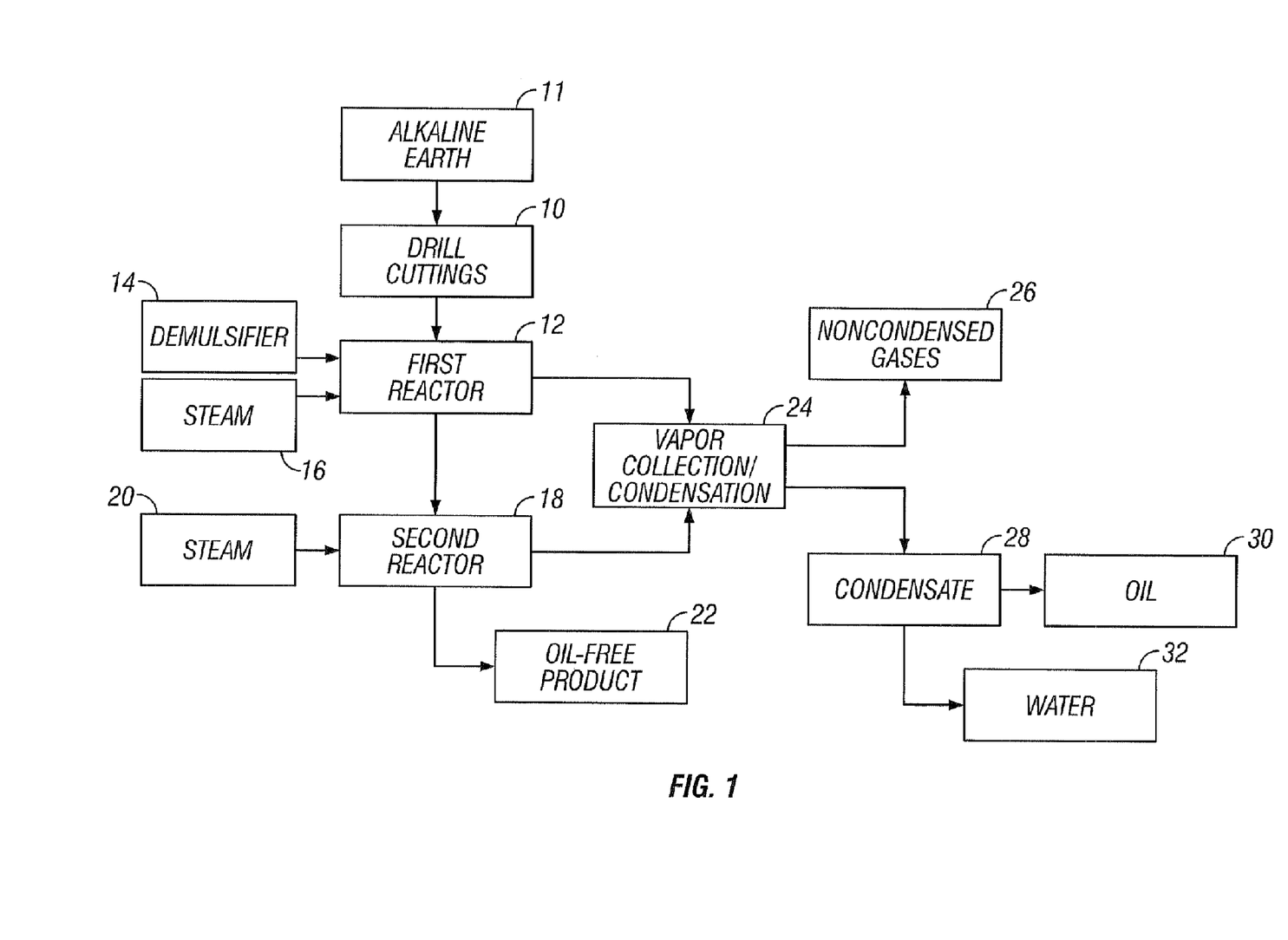
FIG. 1 is a process diagram for the treatment of oil-based drill cuttings according to an embodiment of the invention.

FIG. 1 shows a flow diagram of the treatment of oil-based drill cuttings, indicating the different steps of the distillation process. Drill cuttings 10 are supplied to mixing still 12, where they can combine with heat, preferably applied as steam 16, and optionally an emulsion breaker 14, and can be mixed under high shear conditions. The mixing still 12 can be insulated, heated electrically, or jacketed with steam or other heat transfer fluid. Optionally, an alkaline earth material 11, such as for example, lime, can be added to the drill cuttings prior to addition to the first mixing still. The partially treated drill cuttings from mixing still 12 can be introduced into a second mixing still 18, which can be insulated and/or heated, as previously described with respect to the first still, where an optional second source of steam 20 can be added. The treated cuttings 22 can be discharged from mixing still 18 and can be taken to their final disposal. The steam applied to the substrate can be sufficient to volatize the oil, as well as other volatile organic compounds, by low pressure steam distillation. These gases pass through a vapor collection system and condenser 24 to collect the condensate 28. The non-condensed gases 26 can be vented to the atmosphere. If desired, the condensate 28 from vapor collection/condensation 24 can be separated into oil 30 and water 32 phases. The water phase can be recycled and used to dilute the demulsifier 14, provide water for the steam sources 16 or 20, or as needed for control for the moisture content in the treated cuttings 22.

Figure 2:
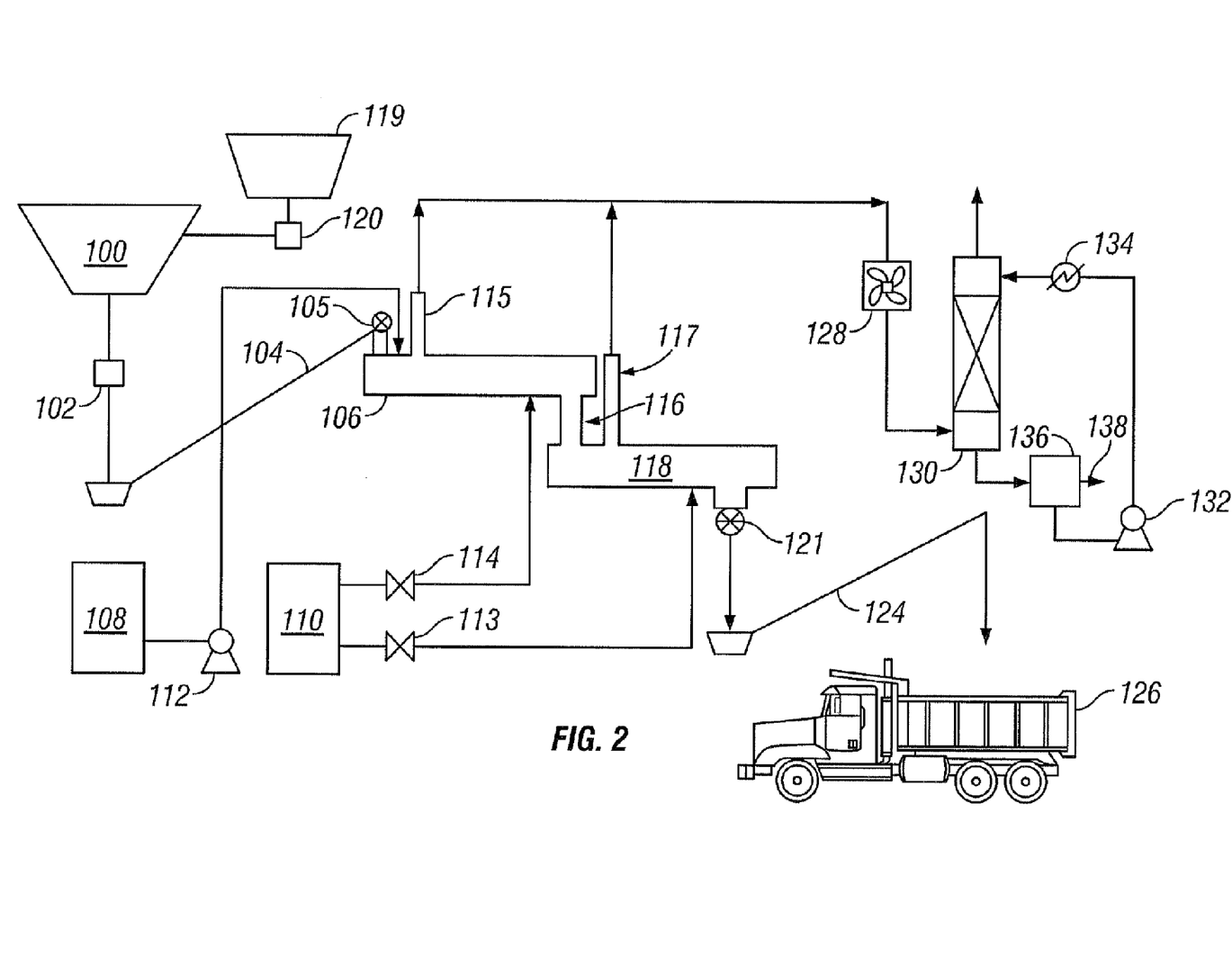
FIG. 2 is a schematic overview of the apparatus according to one embodiment, showing the primary equipment.

FIG. 2 shows the process and the main equipment involved in one embodiment of the invention. The cuttings can be supplied to the system from the cuttings chute 100 and flow by gravity to the cuttings dosage feeder 102. The cuttings can be discharged by gravity to an inclined drag conveyor 104. The untreated cuttings can be raised to the height necessary to be discharged into the first mixing still 106. The first mixing still 106 preferably includes a vapor lock or rotary injector 105 to inhibit the entry of air. Optionally, lime from feeding hopper 119 may be added, dosing through feeder 120, to the cuttings chute 100 for pretreatment of the contaminated substrate prior to introduction to the first mixing still 106. In mixing still 106, a demulsifier can be added from storage tank 108, fed through automatic dosage pump 112. Steam can be added from steam supply 110 via valve 114, in proportion to the quantity of drill cuttings.

Inside the first mixing still 106, any sticky component covering the matrix of the drill cuttings is broken away by the demulsifier and vigorous mixing conditions, exposing the components of the cuttings to the steam, which occurs continuously within the still 106. The materials and design of mixing still 106 help to inhibit sticking of the drill cuttings to the walls and moving parts, although there is no serious detriment to such solids buildup and perhaps may provide some insulating effect. The inhibition of solids sticking is achieved through the use of metal alloys, as well as through the high tangential speeds of the moving parts and the drill cuttings. Once the matrix has been broken and the substrate has been heated or steam treated, the modified matrix can be discharged by gravity via chute 116 into the second mixing still 118.

Inside the second mixing still 118, a second source of heat, preferably applied as steam, can be added from steam supply 110, controlling the addition through valve 113. The second mixing still 118 similarly prevents the buildup of solids as described above with respect to the first mixing still 106. The decontaminated cuttings pass through valve 121 and are emptied onto the inclined transport belt 124 and discharged by gravity into the dump trucks 126 or other disposal receptacle. The valve 121 is preferably a rotary valve or other valve providing a vapor lock inhibiting the entrance of air into the still 118. The decontaminated cuttings may be further treated to reduce the pH if necessary. Removal of gases from the first or second mixing stills 116, 118 can be facilitated by induced draft fan 128, which can remove the gases produced in stills 106 and 118 through discharge connections 115 and 117 respectively, and supplies the vapors to the condensation column 130. Connections 115 and 117 are preferably insulated to prevent premature condensation of the steam and hydrocarbon gases. Optionally, hot air or hot nitrogen gas, supplied at approximately 200° C. (400° F.), can be introduced to either one or both of the mixing stills through an inlet (not shown) located near the outlet end of the mixing still. The counter-current addition of hot gas can facilitate both the hydrocarbon vaporization and also provides a current for removal of the water and hydrocarbon vapor. The non-condensed gases (primarily air and $CO_2$) can be vented to the atmosphere via line 131. The condensation column 130 can be an indirect heat exchanger that cools the gases to form condensate. Alternatively, the condensation column 130 can employ an absorbent, such as for example, water or a commercially available caustic or amine solution, and provide direct heat exchange by contacting the gases with the cooled circulating absorbent. A coolant circulation pump 132, heat exchanger 134 and collection/settling drum 136 can be used to facilitate vapor condensation. Water separated from the condensed gases may be recycled to the steam production 110 (not shown), or added to the demulsifier as a diluent. Accumulated immiscible liquid such as oil or heavy hydrocarbons can be periodically or continuously removed from the drum 136 via line 138. The heat exchanger 134 can be cooled by air or water or any other conventional cooling medium.

Figure 3A:
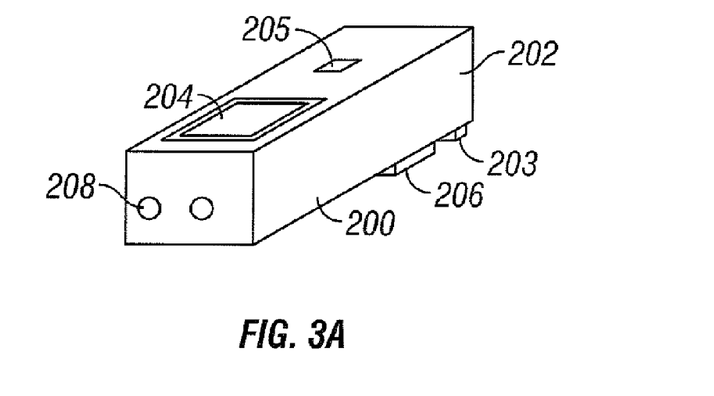
FIG. 3A shows a perspective view of one of the mixing still housings according to one embodiment.
Figure 3B:
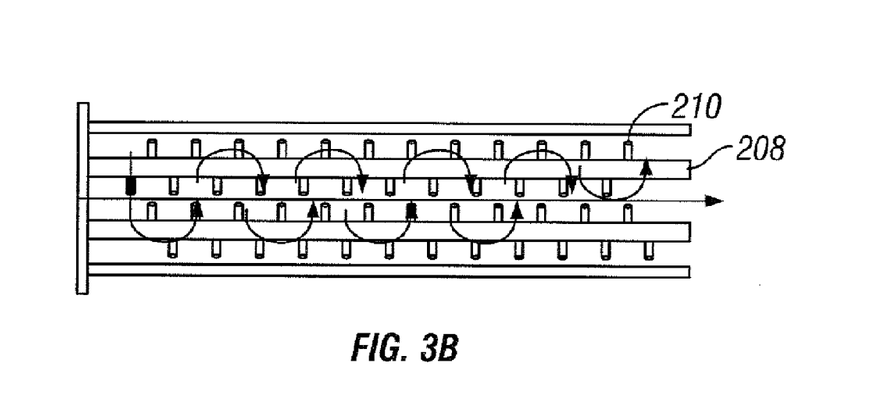
FIG. 3B schematically shows the horizontal flow pattern inside the mixing still housing of FIG. 3A.
Figure 3C:
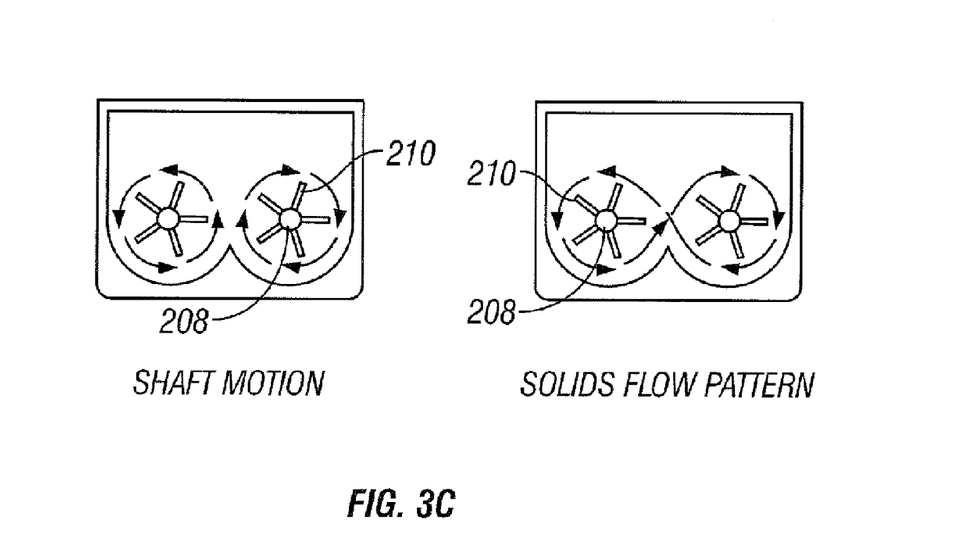
FIG. 3C shows the motion of the shaft and the vertical flow patterns inside the mixing still housing of FIG. 3B.

FIG. 3A shows a perspective view of a housing for mixing still 200, which can be used for either of the mixing stills 106, 118, which can have the same general dimensions and construction. FIGS. 3B and 3C, respectively, show a schematic plan view of the movement of material in mixing still 200, and a schematic elevation of the movement of material in the still 200. Mixing still 200 can include a housing 202, an inlet opening 204 in an upper surface at one end of the mixing still 200, an exhaust vent in an upper surface adjacent inlet opening 204, a discharge opening 206 in a lower surface at the other end of the mixing still 200, and a steam inlet 203 in the lower surface adjacent discharge opening. A pair of shafts 208 are longitudinally aligned in the housing 202 and can be rotated in opposite or complementary directions. A plurality of impellers 210 in the form of pins can be positioned along the length of the shafts 208. The impellers can be ideally pitched to facilitate maximum shear conditions for agitation and movement of the solids, preferably between 70° and 85°, more preferably between 75° and 80°. The arrows in FIGS. 3B and 3C show the horizontal and vertical direction of the movement of the materials, as dosed, including the oil-based drill cuttings and the three reagents. If desired, baffles (not shown) may be positioned between adjacent impellers 210. The internal design and construction materials for the mixing stills are preferably such as to resist extreme pH environments within the process when the heat is provided through the addition of a mineral acid and alkaline earth source, e.g. stainless steel alloy. The substrate and the reagents preferably follow three different movements simultaneously: (1) circular motion on the vertical plane; (2) linear-transverse motion (U type); and (3) longitudinal linear motion along the mixing stills, allowing for the input and output volumes and speeds to be the same.

The speed of the materials throughput, as well as the specific materials used to manufacture the mixers 106, 118, prevent the viscoelastic hydrocarbon and cuttings matrix from sticking to the walls of mixer 106. The moving speed at the tip of the impellers 210 ideally can be between 2 and 8 m/s (7 and 26 ft/s) on rotation and approximately 0.2 m/s (0.7 ft/s) on the translation in both directions (U and linear). More preferably, the tip speed is between 2 and 5 m/s (7 and 16 ft/s), and especially between 2.5 and 3.5 m/s (8 and 12 ft/s). As one example for a mixer treating 10 metric tons per hour of drill cuttings (5 m$^3$/h or 180 ft$^3$/h), the mixers 106, 118 can each have twin parallel shafts approximately 3 m (10 ft) long, running the length of the mixer, each with at least 30 paddles/shaft and a 0.4 m (1.3 ft) diameter. The total residence time preferably does not exceed between 100-120 seconds inside the two mixers (i.e. between 50-60 seconds in each mixer), more preferably the total residence time preferably does not exceed between 80-100 seconds inside the two mixers (i.e. between 40-50 seconds in each mixer). The speed of impeller 210 is critical in creating favorable conditions for the distillation of the substrate contaminants. If the impeller speed is too slow, the substrate will not be properly suspended in the mixer, resulting in poor contact between the contaminated particles and the steam. If the speed of the impeller is too fast, energy is wasted as no improvement in reaction conditions or suspension of the substrate is achieved.

The distillation process requires vigorous agitation of the cuttings within the mixing stills. Preferably, high shear conditions are maintained in the mixing stills, i.e. sufficient agitation to maintain the substrate in a fluidized condition and to avoid formation of dense phase accumulation other than minor caking on interior mixer surfaces. The energy for agitation preferably should not exceed 1.5 hp per metric ton of treated substrate per hour. For example, to treat 30 metric tons per hour of contaminated drill cuttings, the total power required is preferably less than 45 hp. This process can take place at a pressure slightly above atmospheric, thus, a pressure vessel is not required. Preferably, the distillation takes place at a pressure slightly lower than atmospheric pressure. The materials of construction of the mixing still 200 internals are preferably a high nickel stainless steel alloy resistant to corrosion at the pH extremes and the temperatures experienced.

Figure 4:
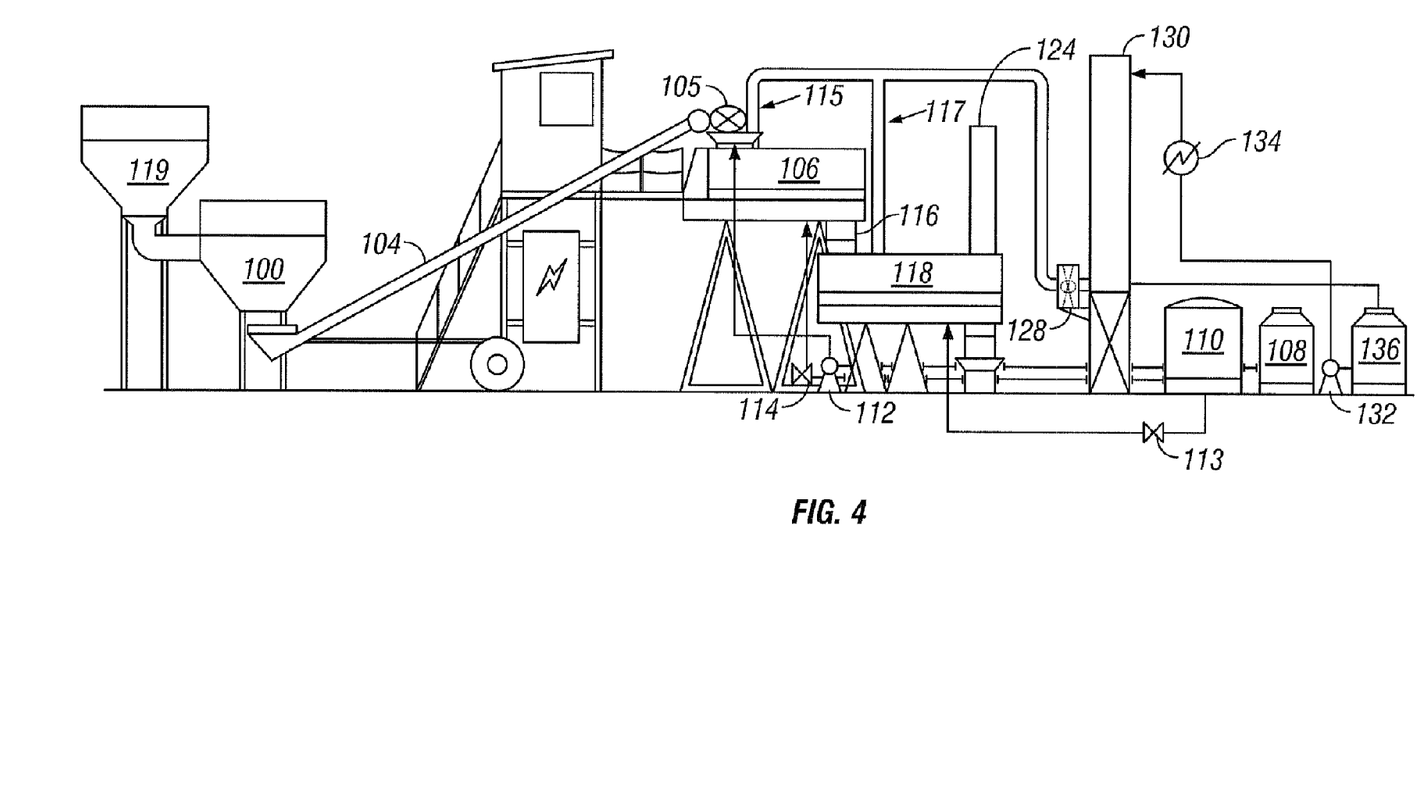
FIG. 4 shows an elevation of the equipment according to one embodiment of the present invention.
Figure 5:
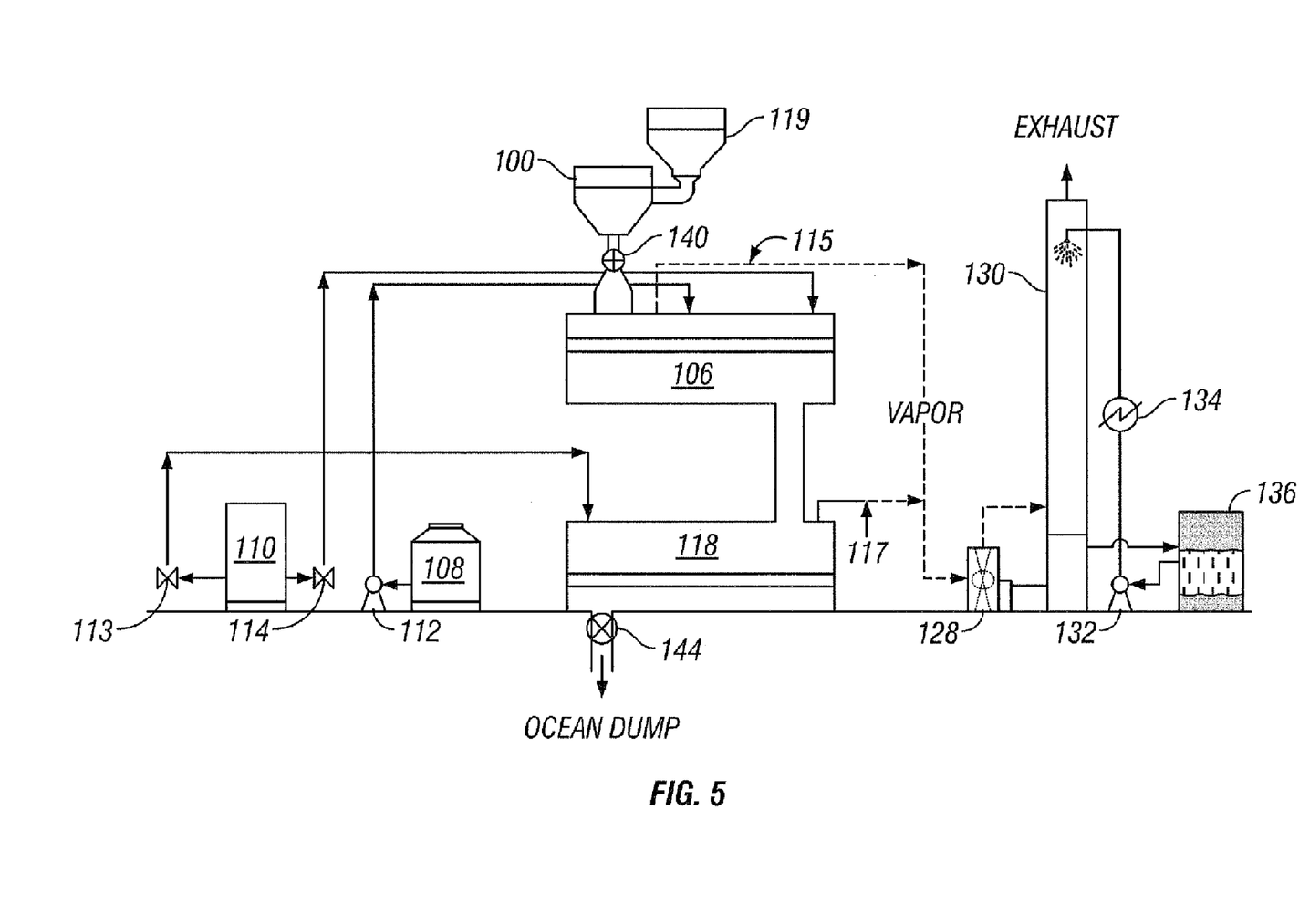
FIG. 5 shows another elevation for the equipment according to another embodiment of the present invention.

In one embodiment of the present invention, a treatment method is provided for offshore applications where the footprint available for the apparatus is limited and generally smaller than what is available in a land based treatment process. To operate under these circumstances and meet the small footprint requirements, the mixers can be positioned in a different alignment, such as for example, the first and second still can be arranged in a vertical alignment rather than a horizontal alignment. The horizontal lay out typical for land-based treatment of contaminated substrates is shown in FIG. 4, while the vertical arrangement more typical for offshore platforms and other applications requiring a minimum footprint size is shown in FIG. 5. For example, in FIG. 5, the second mixer 118 is located directly beneath the first mixer 106.

The solids feeders 140 and 144 in FIG. 5 are preferably rotary feeders to create an air lock to inhibit the entry of air into the mixers 106, 118, which might otherwise tend to reduce the mixer temperature. Alternatively, a spring-biased damper (not shown) can be used to inhibit air entry into the system.

The equipment can be installed permanently or in portable units or modules for temporary applications. If desired, the units can be mounted to wheeled bases for ease in transporting to and from different job sites. In addition to the mixers, other peripheral or secondary equipment is needed as per the handling and metering out of materials handled. This equipment can include hoppers, tanks, feed-meters, pumps and conveyors of different types, in addition to control equipment. The process can be continuous so as to achieve maximum equipment efficiency, lower energy consumption and lower production costs. The process can be automatic so as to insure consistency and unitary process control.

EXAMPLE

A test of the process and apparatus is conducted to treat drill cuttings contaminated with an oil-based drilling mud. The cuttings have an oil content of approximately 13% and a pH of approximately 11.0. The cuttings are supplied at ambient temperature and are continuously processed at a rate of 900 kg/h (2000 lb/h) (15 kg/min; 30 lb/min) two mixing stills arranged in series, each having a capacity of approximately 200 liters (40 gal), twin parallel shafts approximately 2 m (5 ft) in length with 25 paddles/shaft and a 0.2 m (0.7 ft) diameter and a tip speed of at least 3 m/s (7 ft/s). The average residence time of the cuttings in each mixing still is approximately 80 seconds. Steam is continuously added at approximately 30 psi (200 KPa) to an inlet adjacent the outlet of the first mixing still at a rate of 2 kg/min (4 lb/min), and the temperature in the first mixing still is maintained at greater than 100° C. (212° F.) near the outlet. A second steam source is continuously introduced to the second mixing still, adjacent the outlet of said second mixing still, at a rate of 2 kg/min (4 lb/min), and the outlet temperature of the second mixing still is maintained at greater than 100° C. (212° F.). After establishing steady state operation, treated drill cuttings are recovered from the solids discharge at a rate of 20 kg/min (40 lb/min) and have a solids content of approximately 85 weight percent, a hydrocarbon content of less than 3000 ppm, a water content of approximately 3 weight percent, and are in the form of a non-dusting powder. Vapor is recovered from a location adjacent the inlet of the first and second mixing stills using an induced draft fan at a rate of 150 kg/min (300 lb/min), comprising approximately 25 weight percent hydrocarbons, and approximately 75 weight percent steam. The vapor is cooled to condense and recover 2 kg/min (4 lb/min) of hydrocarbon material, 2 kg/min (4 lb/min) of water; and 7 kg/min (15 lb/min) of uncondensed vapor are vented when hot air is added.

What is claimed is:

1. A steam distillation method for removing hydrocarbons from a substrate comprising oil contaminants, the method comprising:
   (a) pretreating the substrate with an organic emulsion breaker and peptizing the substrate with alkaline earth or mineral acid;
   (b) heating the pretreated substrate with a heat transfer medium to vaporize the oil;
   (c) recovering the vaporized oil;
   (d) recovering a treated substrate of reduced oil content.

2. The method of claim 1, wherein the substrate heating comprises direct heat transfer.

3. The method of claim 1, further comprising admixing the heat transfer medium with the substrate.

4. The method of claim 1, wherein the heat transfer medium comprises steam.

5. The method of claim 1, wherein the heat transfer medium comprises air or nitrogen.

6. The method of claim 3, further comprising fluidizing the substrate.

7. A steam distillation method for removing hydrocarbons from a substrate comprising oil contaminants, the method comprising:
   (a) peptizing the substrate with alkaline earth or mineral acid and admixing the peptized substrate with a first steam source with vigorous mixing to vaporize the oil therein;
   (b) recovering steam vaporized oil; and
   (c) recovering a treated substrate of reduced oil content.

8. The method of claim 7, wherein the substrate comprises drill cuttings.

9. The method of claim 7, wherein the substrate contains less than 10 percent oil by weight.

10. The method of claim 7, further comprising pretreating the substrate with an organic emulsion breaker prior to the admixing in (a).

11. The method of claim 10, wherein the emulsion breaker comprises an organic acid or addition salt.

12. The method of claim 11, wherein the emulsion breaker comprises alkylsulfonic acid, arylsulfonic acid, alkylarylsulfonic acid, aralkylsulfonic acid, or a combination thereof.

13. The method of claim 10, wherein the emulsion breaker comprises alkylbenzenesulfonic acid.

14. The method of claim 10, wherein the emulsion breaker comprises dodecylbenzenesulfonic acid.

15. The method of claim 7, further comprising admixing the treated substrate from (a) with a second steam source with agitation to further vaporize remaining oil, and recovering a solid product essentially free of oil.

16. The method of claim 7, wherein the admixing in (a) is under high shear conditions.

17. The method of claim 7, wherein the substrate is fluidized.

18. A steam distillation method for removing hydrocarbons from a substrate comprising oil contaminants, the method comprising:
   peptizing the substrate with alkaline earth or mineral acid and admixing the substrate with a first steam source with vigorous mixing to vaporize the oil therein;
   recovering steam vaporized oil;
   recovering a treated substrate of reduced oil content;
   continuously introducing the substrate into an inlet end of a first mixing still comprising at least one rotatable shaft disposed longitudinally in a housing and having a plurality of impellors spaced along the shaft;
   if the substrate has a water content of less than 20 weight percent or an oil content of more than 30 weight percent, continuously introducing an organic emulsion breaker into the first mixing still at a first location adjacent the inlet end;
   continuously introducing a first steam source into the first mixing still at a second location adjacent to an outlet end of the first mixing still;
   rotating the at least one shaft of the first mixing still to continuously maintain high shear conditions in the first mixing still and discharge the treated solid substrate essentially free of oil.

19. The method of claim 18, wherein the substrate has a residence time in the first mixing still of less than 100 seconds.

20. The method of claim 18, wherein the substrate has a residence time in the first mixing still of less than 50 seconds.

21. The method of claim 18, wherein the substrate is fluidized in the mixing still.

22. The method of claim 18, wherein the substrate comprises drill cuttings.

23. The method of claim 22, wherein the drill cuttings comprise oil contaminated clay.

24. The method of claim 22, wherein the drill cuttings are contaminated with oil-based drilling mud.

25. The method of claim 22, wherein the substrate contains less than 10 percent oil by weight.

26. The method of claim 18, further comprising pretreating the substrate with an organic emulsion breaker prior to the admixing in (a).

27. The method of claim 26, wherein the emulsion breaker comprises an organic acid or addition salt.

28. The method of claim 27, wherein the organic acid or addition salt comprises alkylsulfonic acid, arylsulfonic acid, alkylarylsulfonic acid, aralkylsulfonic acid, or a combination thereof.

29. The method of claim 26, wherein the emulsion breaker comprises alkylbenzenesulfonic acid.

30. The method of claim 26, wherein the emulsion breaker comprises dodecylbenzenesulfonic acid.

31. The method of claim 26, wherein the emulsion breaker is admixed at a rate of from 0.5 to 5 parts by weight per 100 parts of substrate.

32. The method of claim 18, further comprising recovering vapor generated from the first mixing still, condensing the recovered vapor and exhausting non-condensed gases.

33. The method of claim 18, further comprising:
   continuously introducing the treated solid substrate from the first mixing still into an inlet end of a second mixing still comprising at least one shaft disposed longitudinally in a housing and having a plurality of impellors spaced along the shaft;
   continuously introducing a second steam source into the second mixing still at a location adjacent an outlet end thereof;
   rotating the at least one shaft of the second mixing still to maintain high shear conditions in the second mixing still and continuously discharge a solid substrate from the outlet end of the second mixing still, wherein the solid substrate is essentially free of oil.

34. The method of claim 18, wherein peptizing the substrate is with the alkaline earth.

35. The method of claim 34, wherein the alkaline earth comprises lime.

36. The method of claim 34, wherein the alkaline earth is added to the substrate prior to being introduced into the first mixing still.

37. The method of claim 18, wherein peptizing the substrate is with the mineral acid.

38. The method of claim 18, wherein the emulsion breaker is admixed at a rate of from 1 to 1.5 parts by weight per 100 parts of drill cuttings.

39. The method of claim 33, further comprising recovering vapor generated from the first and second mixing stills, scrubbing the recovered vapor and exhausting non-condensed gases from the recovered vapor into the atmosphere.

40. The method of claim 39, wherein the vapor exits the mixing still through insulated columns connected to a condensing column.

41. The method of claim 39, wherein the water is recovered by condensation is recycled to the steam supply.

42. The method of claim 33 wherein the substrate in the second mixing still is fluidized.

* * * * *